(12) United States Patent
Rope et al.

(10) Patent No.: US 8,934,779 B2
(45) Date of Patent: Jan. 13, 2015

(54) OPERATIONAL STATUS INDICATORS IN AN OPTICAL TRANSCEIVER USING DYNAMIC THRESHOLDS

(75) Inventors: Todd Rope, Glendale, CA (US); Mark Heimbuch, Chatsworth, CA (US)

(73) Assignee: Source Photonics, Inc., Chatsworth, CA (US)

( * ) Notice: Subject to any disclaimer, the term of this patent is extended or adjusted under 35 U.S.C. 154(b) by 299 days.

(21) Appl. No.: 13/371,313

(22) Filed: Feb. 10, 2012

(65) Prior Publication Data
US 2013/0209088 A1   Aug. 15, 2013

(51) Int. Cl.
| | | |
|---|---|---|
| H04B 10/00 | (2013.01) | |
| H04B 10/08 | (2006.01) | |
| H04B 10/04 | (2006.01) | |

(52) U.S. Cl.
USPC ............... 398/136; 398/22; 398/192; 398/23

(58) Field of Classification Search
USPC .................. 398/9–38, 135–139, 182–201
See application file for complete search history.

(56) References Cited

U.S. PATENT DOCUMENTS

| | | | | |
|---|---|---|---|---|
| 5,019,769 A * | 5/1991 | Levinson | ................... | 372/31 |
| 5,521,736 A * | 5/1996 | Swirhun et al. | ............... | 398/154 |
| 5,812,572 A * | 9/1998 | King et al. | ................... | 372/38.04 |
| 5,844,928 A * | 12/1998 | Shastri et al. | ............... | 372/38.02 |
| 6,055,252 A * | 4/2000 | Zhang | ........................... | 372/34 |
| 6,624,917 B1 * | 9/2003 | Paschal et al. | ................ | 398/187 |
| 6,826,372 B1 * | 11/2004 | Givehchi | ................... | 398/209 |
| 6,885,828 B1 * | 4/2005 | Cornelius | ................... | 398/209 |
| 6,941,077 B2 * | 9/2005 | Aronson et al. | ............... | 398/137 |
| 6,952,531 B2 | 10/2005 | Aronson et al. | | |
| 6,957,021 B2 * | 10/2005 | Aronson et al. | ............... | 398/137 |
| 7,050,720 B2 * | 5/2006 | Aronson et al. | ............... | 398/137 |
| 7,079,775 B2 | 7/2006 | Aronson et al. | | |
| 7,302,186 B2 * | 11/2007 | Light et al. | ................... | 398/137 |
| 7,720,387 B2 * | 5/2010 | Hahin et al. | ................... | 398/136 |
| 8,086,100 B2 * | 12/2011 | Aronson et al. | ............... | 398/25 |
| 8,249,447 B2 * | 8/2012 | Cai et al. | ........................ | 398/24 |
| 8,515,284 B2 * | 8/2013 | Aronson et al. | ............... | 398/135 |
| 2006/0147216 A1 * | 7/2006 | Dybsetter et al. | ............. | 398/135 |

(Continued)

OTHER PUBLICATIONS

Todd Rope; "Dynamic Memory Allocation in an Optical Transceiver"; U.S. Appl. No. 13/070,358, filed Mar. 23, 2011.

(Continued)

*Primary Examiner* — Ken Vanderpuye
*Assistant Examiner* — Dibson Sanchez
(74) *Attorney, Agent, or Firm* — Andrew D. Fortney; Central California IP Group, P.C.

(57) ABSTRACT

Methods, architectures, circuits, and/or systems for monitoring operating parameters and/or generating status indications associated with electronic device operation are disclosed. The method can include (i) monitoring a first operating parameter related to operation of the electronic device to determine a first parameter value, (ii) calculating a difference between the first parameter value and a predetermined value for the first operating parameter, (iii) monitoring a second operating parameter on which thresholds for operational warnings and/or alarms are based to determine a second parameter value, (iv) updating or changing the thresholds based on a predetermined change or event in the second parameter value, (v) comparing the difference to the updated or changed thresholds, and (vi) generating a corresponding one of the operational warnings and/or alarms when the difference crosses at least one of the thresholds in a predetermined direction.

12 Claims, 7 Drawing Sheets

(56) References Cited

U.S. PATENT DOCUMENTS

| | | | |
|---|---|---|---|
| 2006/0215545 A1* | 9/2006 | Nelson | 370/216 |
| 2006/0269283 A1* | 11/2006 | Iwadate | 398/22 |
| 2009/0028551 A1* | 1/2009 | Mei | 398/25 |
| 2009/0028574 A1* | 1/2009 | Dybsetter et al. | 398/135 |
| 2009/0259796 A1* | 10/2009 | Awyong et al. | 711/102 |
| 2010/0150567 A1* | 6/2010 | Kondo et al. | 398/137 |

OTHER PUBLICATIONS

Todd Rope; "Operational Status Flag Generation in an Optical Transceiver"; U.S. Appl. No. 13/075,092, filed Mar. 29, 2011.

Todd Rope and Mark Heimbuch; "Operational State Information Generation in an Optical Transceiver"; U.S. Appl. No. 13/348,599, filed Jan. 11, 2012.

* cited by examiner

OPERATIONAL STATUS INDICATORS IN AN OPTICAL TRANSCEIVER USING DYNAMIC THRESHOLDS

FIELD OF THE INVENTION

The present invention generally relates to the field of optical devices such as optical receivers, transmitters, transceivers, etc. More specifically, embodiments of the present invention pertain to methods, algorithms, architectures, circuits, software, and/or systems for monitoring operational parameters in optical devices utilizing dynamic thresholds.

DISCUSSION OF THE BACKGROUND

Optical transceivers send and receive data in an optical form over an optical link, such as a fiber-optic link. An optical transmitter can include laser driver circuitry to drive a laser or diode, such as a light-emitting diode (LED), to create optical pulses on the fiber-optic link from received electronic signals. An optical receiver can include a photosensitive diode to receive optical signals, which are then converted into electronic signals. Thus, an optical transceiver converts (i) optical signals into analog and/or digital electronic signals, and (ii) electronic signals into optical signals.

In order to determine if the optical transceiver is functioning correctly, various operational parameters are monitored. Flags are then generated to demonstrate the status of the operational parameters. In conventional approaches, the flags indicate whether a parameter is greater than or less than a predetermined threshold value. For example, a flag may indicate that a monitored temperature value is slightly greater than a predetermined temperature value (e.g., a high temperature warning threshold). In some embodiments, a flag may indicate that a monitored temperature value is significantly greater than a predetermined temperature value (e.g., a high temperature alarm threshold). Thus, conventional transceivers monitor certain parameters to generate a flag(s) that indicates when a parameter value is higher or lower than a predetermined operating value.

However, threshold values used for flag generation in conventional transceivers are static, and do not change with changes in environmental or operating conditions. Certain thresholds (e.g., predetermined allowable ranges and/or variances in bias current) may be acceptable for a given temperature or range of temperatures, but may not be acceptable for temperatures outside of the given temperature or range. For example, at room temperature, a transceiver may rely upon initial threshold values to accurately reflect allowable operating conditions at room temperature. However, when the temperature of the transceiver increases to a temperature significantly greater than room temperature, the initial threshold values may not accurately reflect ideal or allowable operating conditions at the increased temperature. That is, at the increased temperature, flags indicative of a hardware malfunction at room temperature may be generated (i.e., based on the initial temperature threshold values), even though the transceiver is safely operating at the increased temperature. Thus, conventional transceivers may have issues with obtaining and/or generating accurate operational information when environmental or operating conditions change.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention relate to methods, algorithms, architectures, circuits, software, and/or systems for monitoring one or more operational parameters in an optical device utilizing dynamic thresholds.

In one embodiment, an optical transceiver can include (i) an optical receiver configured to receive optical data; (ii) an optical transmitter configured to transmit optical data; (iii) one or more memories configured to store (1) data from one or more first operational parameters of the transceiver, (2) data from a second operational parameter different from a corresponding one of the first operational parameter(s), and (3) a plurality of thresholds for each of the first operational parameter(s); and (iv) logic configured to (1) update or change the plurality of thresholds for the corresponding first operational parameter based on a predetermined change or event in the second operational parameter, (2) compare the data from the corresponding first operational parameter against at least one of the updated or changed thresholds, and (3) generate an alarm and/or warning when the data from the corresponding first operational parameter crosses one of the updated or changed thresholds in a predetermined direction. In further embodiments, the optical transceiver comprises one or more analog-to-digital converters (ADCs) coupled to the optical transmitter and the optical receiver, and the memory(ies) comprise a register configured to store the data relating to the operational parameters from the ADCs. This invention further relates to an optical triplexer that includes such an optical transceiver.

In another embodiment, a method of monitoring one or more operating parameters in an electronic device can include (i) monitoring a first operating parameter related to operation of the electronic device to determine a first parameter value, (ii) calculating a difference between the first parameter value and a predetermined value for the first operating parameter, (iii) monitoring a second operating parameter on which thresholds for operational warnings and/or alarms are based to determine a second parameter value, (iv) updating or changing the thresholds based on a predetermined change or event in the second parameter value, (v) comparing the difference to the updated or changed thresholds, and (vi) generating a corresponding one of the operational warnings and/or alarms when the difference crosses at least one of the thresholds in a predetermined direction. In further embodiments, calculating the difference comprises calculating a percentage variance between the first parameter value and the predetermined value for the first operating parameter.

In another embodiment, a method of monitoring one or more parameters in an electronic device can include (i) monitoring a first operating parameter related to operation of the electronic device to determine a first parameter value, (ii) monitoring a second operating parameter on which thresholds are based to determine a second parameter value, the second operating parameter being different from the first operating parameter, (iii) updating or changing the thresholds based on a predetermined change or event in the second parameter value, (iv) comparing the first parameter value to the thresholds to produce a result, and (v) generating an alarm and/or warning when the result crosses at least one of the thresholds in a predetermined direction.

Embodiments of the present invention can advantageously provide an approach for generating and/or calculating operational status warnings and/or alarms utilizing dynamic thresholds. Embodiments of the present invention utilize dynamic thresholds to provide accurate, up-to-date operational status information for an optical transceiver. By utilizing the present invention, changes in operational status indications can reflect changes in operational or environmental conditions, and inaccurate status indications that might otherwise reflect malfunctioning hardware or an end of life (EOL) condition can be avoided. Additionally, by utilizing thresholds that are a function of an operating parameter (e.g., temperature, bias current, time, etc.) that changes during operation, the present invention can more accurately identify a current operating state of a transceiver and provide more valuable information to the user in comparison to conventional transceivers.

These and other advantages of the present invention will become readily apparent from the detailed description of various embodiments below.

DETAILED DESCRIPTION

Figure 1:
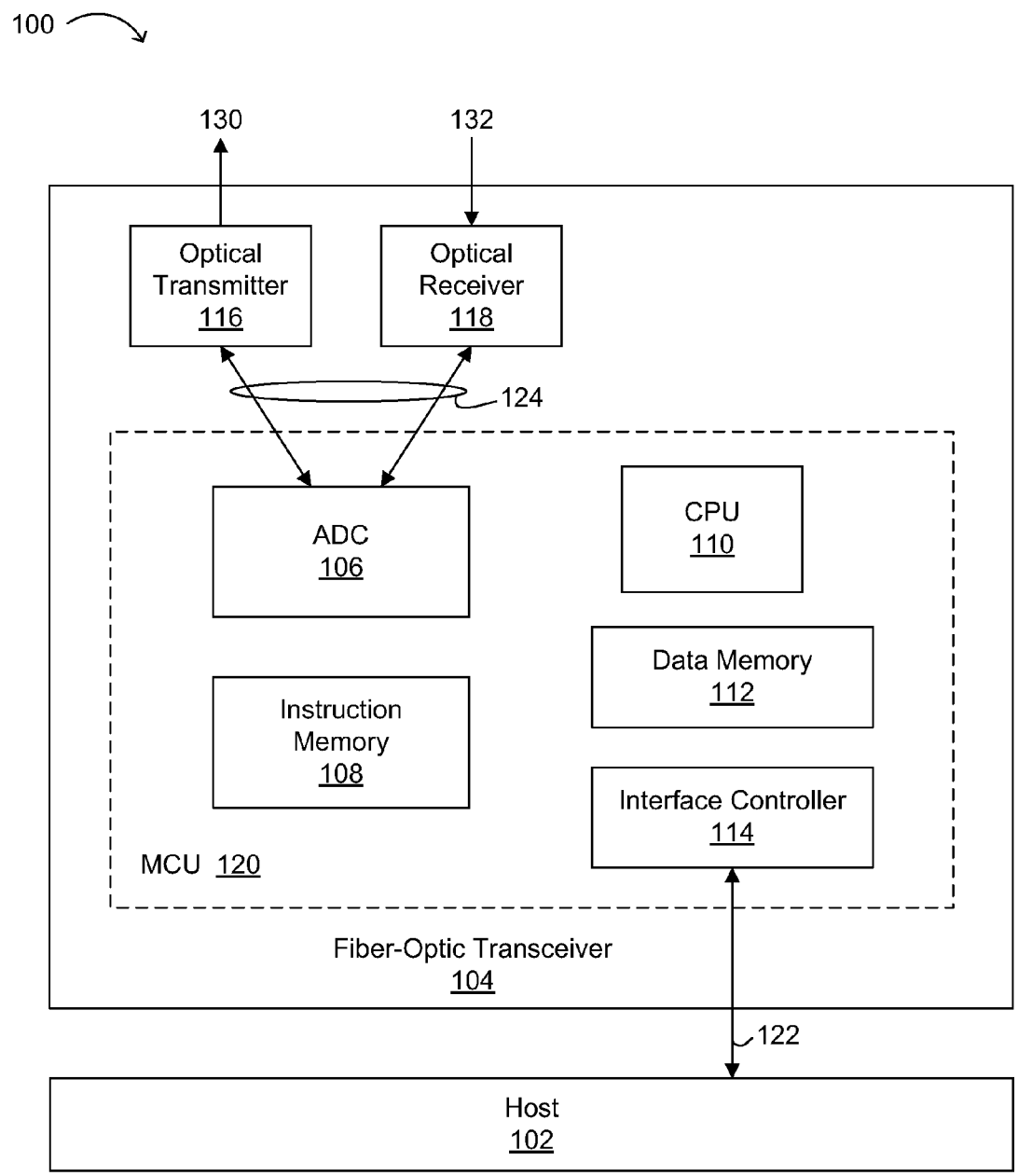
FIG. 1 is a block diagram showing an exemplary optoelectronic system in accordance with embodiments of the present invention.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the disclosure.

Some portions of the detailed descriptions which follow are presented in terms of processes, procedures, logic blocks, functional blocks, processing, and other symbolic representations of operations on code, data bits, or data streams within a computer, processor, controller and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, streams, values, elements, symbols, characters, terms, numbers, or the like, and to their representations in computer programs or software as code (which may be object code, source code or binary code).

It should be borne in mind, however, that all of these and similar terms are associated with the appropriate physical quantities and/or signals, and are merely convenient labels applied to these quantities and/or signals. Unless specifically stated otherwise and/or as is apparent from the following discussions, it is appreciated that throughout the present application, discussions utilizing terms such as "operating," "calculating," "determining," or the like, refer to the action and processes of a computer or data processing system, or similar processing device (e.g., an electrical, optical, or quantum computing or processing device or circuit), that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data similarly represented as physical quantities within other components of the same or a different system or architecture.

Furthermore, in the context of this application, the terms "signal" and "bus" refer to any known structure, construction, arrangement, technique, method and/or process for physically transferring a signal from one point in a circuit to another. Also, unless indicated otherwise from the context of its use herein, the terms "designated," "fixed," "given," and "predetermined" generally refer to a value, quantity, parameter, constraint, condition, state, process, procedure, method, practice, or combination thereof that is, in theory, variable, but is typically set in advance and not varied thereafter when in use. Similarly, for convenience and simplicity, the terms "time," "rate," "period" and "frequency" are, in general, interchangeable and may be used interchangeably herein, but are generally given their art-recognized meanings. Also, for convenience and simplicity, the terms "data," "bits," and "information" may be used interchangeably, as may the terms "coupled to," and "in communication with" (which may refer to direct or indirect connections, couplings, or communications), but these terms are generally given their art-recognized meanings herein.

The invention, in its various aspects, will be explained in greater detail below with regard to exemplary embodiments.

Exemplary Transceiver with Operational Status Indications Using Dynamic Thresholds In one example, a transceiver capable of generating operational status indications can include (i) an optical receiver configured to receive optical data, (ii) an optical transmitter configured to transmit optical data, (iii) one or more memories configured to store (1) data from one or more first operational parameters of the transceiver, (2) data from a second operational parameter different from a corresponding one of the one or more first operational parameters, and (3) a plurality of thresholds for each of the one or more first operational parameters, and (iv) logic configured to (1) update or change the plurality of thresholds for the corresponding first operational parameter based on a predetermined change or event in the second operational parameter, (2) compare the data from the corresponding first operational parameter against at least one of the updated or changed plurality of thresholds, and (3) generate an alarm and/or warning when the data from the corresponding first operational parameter crosses at least one of the updated or changed thresholds in a predetermined direction. For example, the thresholds may indicate an acceptable percentage variance or numerical difference from a target parameter value.

Generally, the thresholds for the first operational parameter change as a function of the second operational parameter value. When a predetermined condition, value, or event in the second operational parameter is met, the thresholds for the first operational parameter may be changed or updated. The thresholds being updated or changed in response to the predetermined condition, value, or event being met can be characterized as "dynamic thresholds." For example, the first operational parameter may be a bias current to an optical transmitter (e.g., a laser diode), and the second operational parameter may be a temperature of the optical transmitter. When the temperature of the optical transmitter reaches a predetermined threshold value, the bias current thresholds can be changed to reflect more ideal transmitter operating conditions at the increased operating temperature. With the change in temperature factored in determining an operational status of the transceiver, the updated thresholds may more accurately reflect a current operating condition of the transceiver in comparison to conventional transceivers.

Additionally, for each of the first operational parameters having variable thresholds, the second operational parameter is different from the first operational parameter. For example, an optical transceiver may have three first operational parameters (e.g., a bias current, a bias voltage, and a modulation frequency) that have target performance values that are dependent on a single operating parameter (e.g., a laser diode temperature). Thus, an optical transceiver may have n first operational parameters dependent on a second operating parameter, where n is a positive integer greater than or equal to 1 (e.g., 1, 2, 4, 5, 10, or more). In any case, the second operational parameter is different from the corresponding first operational parameter(s). Additionally, the first operational parameter in one embodiment may be the second operating parameter in another embodiment. For example, in one embodiment, voltage (e.g., the first operational parameter) may be a function of time (e.g., the second operational parameter), and in a second embodiment, modulation amplitude (e.g., the first operational parameter) may be a function of voltage (e.g., the second operational parameter). Furthermore, not all of the monitored first operational parameters have thresholds that change as a function of the second operating parameter. For example, a monitored voltage may have thresholds that do not change, regardless of the values of other monitored parameter(s).

FIG. 1 illustrates an exemplary system 100 and optical transceiver 104 in accordance with embodiments of the present invention. Optical transceiver 104 (e.g., a fiber-optic transceiver) can be coupled to a host 102 or other external device. Host 102 can be a host processor, circuit board, stand-alone optical network device (e.g., repeater, optical switch, set-top box, etc.) or any other component or device including a suitable controller or processor. Host 102 can interface with optical transceiver 104 via communications interface 122. Communications interface 122 can be a serial interface, and is configured to provide bidirectional communications between host 102 and fiber-optic transceiver 104 (e.g., via interface controller 114). Alternatively, communications interface 122 can be a parallel interface carrying a multi-bit signal.

Optical transceiver 104 can include a microcontroller unit (MCU) 120, an optical transmitter 116, and an optical receiver 118. For example, optical transmitter 116 can include a light-emitting diode (LED), laser diode, or any other suitable device for generating light pulses (e.g., optical signals) over an optical signal medium 130 (e.g., a fiber-optic link). Optical receiver 118 can be a photodiode or any other device configured to receive an optical signal 132 and convert the received optical signal into an electrical signal. Optical signals 130 and 132 may be separate optical links, or may be part of a common fiber-optic link or any other suitable optical connection (e.g., optical waveguide, multi-mode fiber[s] [MMF], single-mode fiber[s] [SMF], etc.). In addition, an optical duplexer, an optical triplexer, or other multiple transceiver configurations can be formed by including two or more optical transmitters 116 or optical receivers 118 (e.g., two or more optoelectronic transmitters with a single optoelectronic receiver).

Analog electronic signals 124 are transmitted between analog-to-digital converter (ADC) 106 and optical transmitter 116, and between optical receiver 118 and ADC 106. Analog electronic signals 124 can accommodate optical signal information in an electronic form. ADC 106 can then convert these electronic signals from an analog form into a digital form to allow for digital processing within MCU 120. MCU 120 can further include interface controller 114, central processing unit (CPU) or microprocessor 110, and memory (e.g., instruction memory 108 and/or data memory 112). MCU 120 generally receives and transmits communications with host 102 over host communications interface 122.

Figure 2:
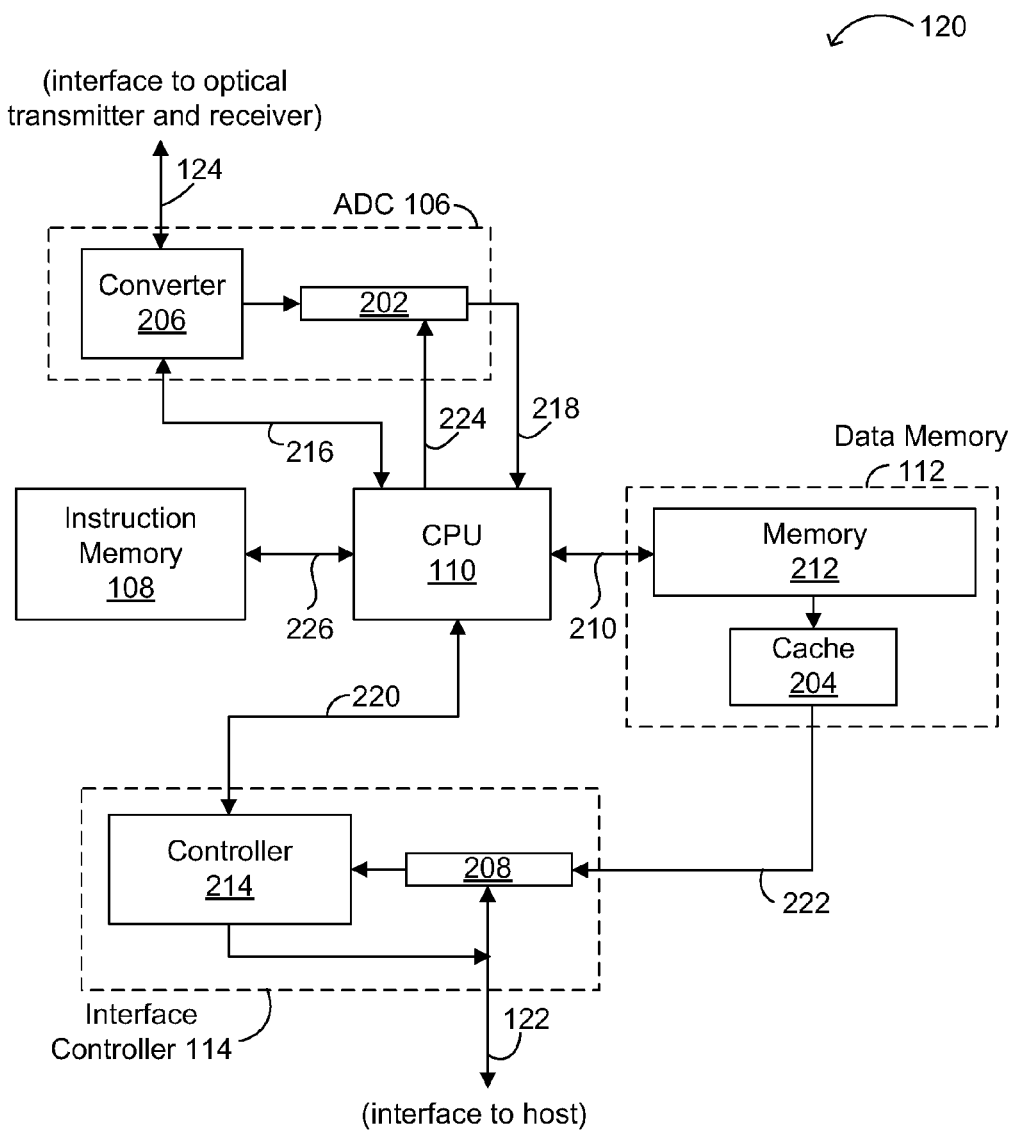
FIG. 2 is a block diagram showing exemplary hardware for an optical transceiver in accordance with embodiments of the present invention.

In certain embodiments, memory 108 includes non-volatile memory (e.g., instruction memory 108) and volatile memory (e.g., data memory 112, cache 204 [see FIG. 2]). Generally, thresholds are stored in volatile memory. In some applications, instructions can be stored in the volatile memory (e.g., RAM) or other high-speed memory for performance reasons. Further, various data memory (e.g., configuration data and/or initial thresholds) can be stored in ROM or other non-volatile memory for efficiency reasons, such as when the stored data does not change or changes relatively infrequently. Examples of non-volatile memories include electrically erasable programmable read-only memory (EEPROM), Flash EEPROM, magnetoresistive RAM (MRAM), laser programmable memories (e.g., fuse-based), or any other suitable type of ROM or non-volatile storage. Examples of volatile memories include static random-access memory (SRAM), dynamic RAM (DRAM), or any other suitable type of RAM or volatile storage element that maintains a stored state when power is applied and that can be rewritten without application of special voltages or use of special procedures (e.g., conventional non-volatile memory write and/or erase procedures).

Exemplary Microcontroller for an Optical Transceiver

FIG. 2 illustrates an exemplary microcontroller 120 for an optical transceiver (e.g., optical transceiver 104 in FIG. 1) in accordance with embodiments of the present invention. ADC 106 can interface with an optical transmitter and an optical receiver (not shown) via optical information signals 124. CPU 110 may utilize control signal 216 for interacting with ADC 106 via converter 206. Register 202 can contain an output for ADC 106 by capturing output data from converter 206. In some cases, a demultiplexer (not shown) or a bank of registers may be used in addition to, or in place of, register 202 in order to support a higher rate of data output from converter 206. For example, data can be output from converter 206 into a bank of registers in a sequential or round-robin fashion. In the example of a demultiplexer, data output from converter 206 may be sent via the various demultiplexer outputs to CPU 110 or to a register bank elsewhere in the optional transceiver.

For example, register 202 can include parametric data related to operation(s) of optical transmitter 116 and/or optical receiver 118 (see, e.g., FIG. 1). As discussed above, register 202, while shown in FIG. 2 as a single register, can also be implemented as a bank of registers, or an otherwise larger memory portion for capturing larger amounts of data from ADC 106. For example, various parametric data can be captured in a serial fashion or in parallel. As a result, although the output of converter 206 is generally multi-bit (e.g., n bits wide, where n is an integer of at least 2, such as 4, 6, 8, 10, 12, 16, 32, etc.), the data output by register 202 may be serial or parallel. In order for CPU 110 to retrieve this parametric data, data access control signal 224 can be activated by CPU 110. In response to control signal 224, data from register 202 can be output via ADC output signal/bus 218.

Parametric data (e.g., related to operation(s) of optical transmitter 116 and/or optical receiver 118) can be supplied to ADC output register 202 and/or accessed by CPU 110 (via ADC output signal/bus 218) at a predetermined frequency and/or on-demand. For example, converter 206 can periodically update register 202 during normal operation of ADC 106 and/or CPU 110. When data access control signal 224 is held in an active state, CPU 110 can receive the periodically updated data from register 202 via ADC output signal 218 at the same frequency that the parametric data is supplied to ADC output register 202 (e.g., from the optical transmitter 116 and/or optical receiver 118). For example, this parametric update rate can vary from about 1 ms to about 100 ms (e.g., about 50 ms), or at any other update rate within this range or outside this range, depending on the operating frequencies of ADC 106 and CPU 110 and the design of register 202 (e.g., whether it is or is part of a bank of registers, whether it includes a demultiplexer, etc.). Certain embodiments may also support a plurality of parametric data update rates (e.g., different update rates for different parameters), including variable update rates for one or more of the parameters for which data are periodically updated. In some embodiments, ADC 106 is used to monitor a first operating parameter (e.g., parametric data related to operation(s) of optical transmitter 116 and/or optical receiver 118), and a second ADC (not shown) is used to monitor a second operating parameter different from the first operating parameter. The different ADCs can operate at the same rate or at different rates.

In some applications, this parametric data update rate can be programmed by the manufacturer or a user. For example, the manufacturer can program data update rates appropriate for each parameter being monitored. For example, bias current and laser temperature may be updated relatively frequently (e.g., 1 update per 1-10 microseconds), but voltages or time may be updated relatively less frequently (e.g., 1 update per minute, hour, or day). Alternatively, a variety of supported update rates can be presented to the user for selection via a graphical user interface (GUI). Also, while a given parametric data update rate can be selected or otherwise fixed, parametric data can also be updated upon demand, such as in response to a request from host 102. In some cases, an option (e.g., a user option) can be employed whereby the parametric data is designated to be determined periodically or only updated upon demand. In other cases, on-demand parametric data updating can essentially act as an override or supplement to an otherwise periodic parametric data update mode. Thus, parametric data can be updated via register 202 and ADC output signal 218 periodically and/or upon demand, and these parametric data update modes may depend on particular applications, certain parameters, as well as manufacturer and/or user configurations.

CPU 110 can retrieve (e.g., fetch and/or pre-fetch) instructions from instruction memory 108 via interface signals 226. CPU 110 can also interface with data memory 112 via bus(es) 210. For example, parametric data received from ADC output 218 can be provided on bus(es) 210 to data memory 112 for storage. Bus(es) 210 may be a single bus or multiple-bit bus configured for serial and/or parallel communication, and may support unidirectional and/or bidirectional signaling. CPU 110 can also send control signals on bus(es) 210 to control accessing of parametric data and thresholds (including dynamic thresholds) from data memory 112 in order to calculate and/or determine operational status indications (e.g., alarms and/or warnings) therefrom. Such accessing of parametric data and thresholds from data memory 112 may be performed periodically and/or in response to on-demand requests, such as requests from host 102 (e.g., to obtain an operational status and/or modify or set one or more thresholds). For example, data memory 112 can be accessed by CPU 110 and provide parametric data and thresholds at substantially the same rate that ADC output signal 218 is updated, or at a higher or lower rate.

In one example, data memory 112 can include memory portion 212 and cache portion 204. Cache portion 204 can be a smaller and faster memory (e.g., have a smaller capacity/density and be configured to operate at a higher frequency) relative to the remaining portion of data memory 112. Memory portion 212 and/or cache portion 204 can also include a variety of registers that can be allocated for storage of parametric data, threshold values, error checking code, percentage variances, percentage differences, and comparison results. Further, memory portion 212 and cache portion 204 can be subdivided into any number of blocks or other arrangements (e.g., different pages of memory or even different memory integrated circuits [ICs]). In this particular exemplary arrangement, cache portion 204 can provide data memory output signal 222 to interface controller 114. For example, cache portion 204 may store copies of certain parametric data and associated thresholds that are most likely to be requested by CPU 110 for operational status determination. In one embodiment, a user may configure a predetermined number of parameters and/or thresholds to be stored in cache portion 204 and memory portion 212 such that an associated operational status indication (e.g., an operational alarm or warning) can be determined and provided to host 102 in less processing time than methods not utilizing a cache portion 204. Alternatively, copies of parametric data and associated thresholds in memory portion 212 can be made in cache portion 204 based on other factors, such as parametric data and/or thresholds that are most recently written to or stored in memory portion 212, or parametric data and thresholds that correspond to an operational status indication most recently requested by host 102. In this fashion, cache portion 204 may effectively be used to decrease operational status indication read time to service a request from host 102.

In certain embodiments, MCU 120 maintains parametric data, thresholds, error checking code (optionally), percentage variance(s), percentage difference(s), threshold comparison results (operational statuses), and latched thresholds in data memory 112. A request for a status indication such as an alarm or warning can be received by interface controller 114 via host communications interface 122. The operational status request (e.g., from host 102) can include an identifier for the requested threshold register. Register 208 can store the incoming threshold register identifier as well as associated outgoing threshold information. Alternatively, separate registers can be used to store incoming identifier information and outgoing threshold data. Controller 214 (e.g., a microcontroller, programmable logic device [PLD], complex PLD [CPLD], field-programmable gate array [FPGA], application specific integrated circuit [ASIC], system on chip [SoC], etc.) within interface controller 114 can send the request to CPU 110 using command signal(s) 220. CPU 110 may then correlate or map the identifier from the status indication request to one or more particular memory locations in data memory 112 at which the corresponding parametric data and associated thresholds are located. For example, CPU 110 may maintain a table that maps the threshold register identifier from the status indication request to the appropriate storage locations in data memory 112 (e.g., dynamic threshold registers 312) so that CPU 110 can retrieve corresponding parametric data and thresholds for calculation of the requested status indication (see, e.g., U.S. patent application Ser. Nos. 13/070,358 and 13/075,092, filed Mar. 23, 2011 and Mar. 29, 2011, respectively, the relevant portions of which are included herein by reference). The table may comprise a bank of pointer registers (e.g., in cache 204, data memory 112, or in dedicated CPU memory) that is accessed when the status indication request is received via command signal(s) 220.

Once CPU 110 receives the operational status request via command signal/bus(es) 220, CPU 110 can send a memory read request to data memory 112 via signal 210. Once the request, command, or a version or derivative thereof (e.g., an operational status identifier) received on host communications interface 122 is sent to CPU 110 via command signal 220, CPU 110 can issue a read command via bus(es) 210 to data memory 112. As part of this process, CPU 110 can effectively translate information received from host 102 as part of the operational status request into actual memory locations that store the parametric data and associated thresholds to be accessed in order to calculate the requested alarm and/or warning. The operational status can then be sent from the CPU 110 to the data memory 112, and read from data memory 112 via memory output signal 222. Alternatively, the operational status indication may be directly sent from CPU 110 to interface controller 114. In any event, interface control register 208 can receive the operational status indication, which may then be provided to host 102 via host communications interface 122. As discussed above, interface control register 208 may also be used to store the incoming status identification. In this case, register 208 may be wide enough (e.g., 32 bits wide, 64 bits wide, 128 bits wide, etc.) to accommodate such incoming request information and outgoing status information. Alternatively, separate registers (e.g., having a width of 16 bits, 32 bits, 64 bits, etc.) can be used to store incoming information requests and outgoing status indication data. Further, various registers and storage locations discussed herein may also be lumped together in the same memory block or other similar storage structure.

Acceptable threshold register sizes (e.g., 8 bits wide, 16 bits wide, 32 bits wide, etc.), depending on CPU architecture, operating system, as well as other design considerations (e.g., the number of bits of resolution of the parametric data), etc., can be determined for each particular embodiment utilized. In certain embodiments, acceptable threshold register formats (e.g., bit maps, unsigned/signed integers, IEEE floating point, etc.) can also be supported. Furthermore, any suitable capacity (e.g., at least 2 kB, several kB, 16 kB, or higher) of data memory 112 can be supported in particular embodiments. Also, any suitable memory technologies or types of memories (e.g., flash memory, serial EEPROM, SRAM, DRAM, etc.) can be supported in particular embodiments. In addition, cache memory 204 (see, e.g., FIG. 2) can represent a smaller and faster memory relative to a remaining portion of data memory 112. Various registers and/or allocated memory portions can be found or replicated within cache memory 204 to support faster accesses to parametric data, thresholds, and/or status indications that may be stored therein.

Figure 3:
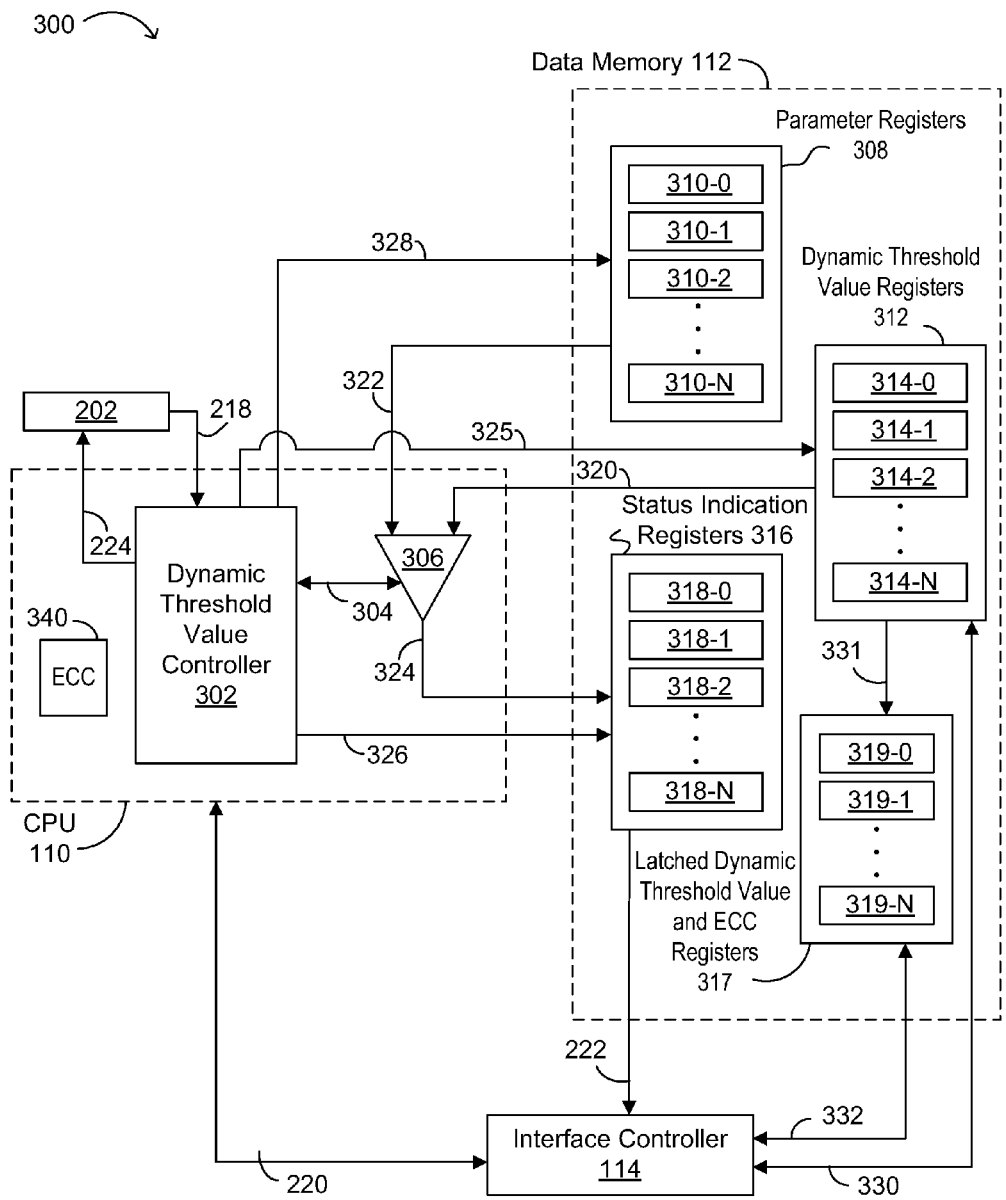
FIG. 3 is a block diagram showing an exemplary dynamic threshold control structure in accordance with embodiments of the present invention.

FIG. 3 illustrates an exemplary dynamic threshold control structure 300 in accordance with embodiments of the present disclosure. Dynamic threshold value controller 302 in CPU 110 can activate signal 224 to read the parametric data contents of ADC output register 202 on ADC output signal/bus 218. Dynamic threshold controller 302 can then write the accessed parametric data into parameter registers 308 via bus 328. Buses and/or signals 320, 322, 324, 325, 326, and 328 shown in FIG. 3 may represent more detailed versions of the bus(es) 210 shown in FIG. 2.

Dynamic threshold control structure 300 also comprises parameter registers 308. Parameter registers 308 can include any number of registers 310 (e.g., 310-0, 310-1, 310-2, ... 310-N). As discussed above, ADC output register 202 may be implemented as a bank of registers instead of one register, and operating parameter registers 308 may form this bank of registers as a replacement for, or in addition to, ADC output register 202. Additionally, dynamic threshold value registers 312 can include various individual registers 314 (e.g., 314-0, 314-1, 314-2, ... 314-N) for storing thresholds for use in determining whether a particular operating parameter in any of operating parameter registers 308 crosses at least one corresponding threshold value (e.g., in a predetermined direction) from dynamic threshold register 312. In one example, dynamic threshold value controller 302 can access corresponding parametric data from parameter registers 308 on bus 322 and corresponding thresholds from threshold registers 312 on bus 320 based on a (register) identifier in the status request. A comparator 306 may then compare appropriate parametric data (e.g., via bus 322) against corresponding thresholds (e.g., via bus 320) to determine a comparison value at comparator output 324 that indicates the relative magnitude of the parametric data versus the threshold. Comparator 306 may be a digital comparator or magnitude comparator that receives two numbers (e.g., parametric data for first and second operating parameters) as input in binary form (e.g., bit strings) and determines whether a first one of the numbers is greater than, less than, or equal to the second number. As discussed below in greater detail, comparator 306 may also compare a percentage variance (e.g., from a target parameter value) to a percentage difference (e.g., representing a particular threshold). Additionally, the dynamic threshold registers 312 may contain default values that define initial thresholds for a given parameter. In some embodiments, threshold registers 312 can be initially programmed by a user via host 102 by way of interface controller 114 on bus 330.

Dynamic threshold control structure 300 also comprises latched dynamic threshold value and error checking code (ECC) registers 317. At least one of latched dynamic threshold value and ECC registers 317 (e.g., registers 319-0, 319-1, 319-2, ... 319-N) stores the same threshold as that stored in a corresponding dynamic threshold value register 312, with ECC added thereto. For example, an ECC can be calculated on the threshold data (e.g., by ECC block 340 in CPU 110), appended to the threshold, and the combined threshold and ECC can be stored in one or more dynamic threshold value register(s) 312 (e.g., registers 314-1 and 314-2 in registers 312). Alternatively, ECC block 340 can perform an error checking calculation (e.g., a checksum, a parity determination, a cyclic redundancy code [CRC], etc.) on the threshold stored in register 312 to generate the error checking code, which is appended onto the threshold and then stored in dynamic threshold value and ECC registers 317. Thus, the ECC stored in registers 312 and/or registers 317 can be used to check or confirm that the corresponding threshold value is correct.

In one example, a "memory lock" request can be provided to controller 302 (e.g., via interface controller 114 on bus 332). In response to the request, some or all of the thresholds and corresponding ECCs in threshold registers 312 are copied to and/or latched in latched dynamic threshold value and ECC registers 317 (e.g., by controller 302 via bus 331), and the dynamic threshold value registers 312 are then "locked" (i.e., not enabled for write operations). After the "memory lock" request is removed (e.g., by providing a "memory unlock" request to dynamic threshold value controller 302), the dynamic threshold value registers 312 may be overwritten with new threshold values. However, the ECC on the new threshold values may not be recalculated right away (or at all). Thus, dynamic threshold values register(s) 312 can continue to be updated, even though ECCs on the new thresholds are not necessarily recalculated. Therefore, an ECC associated with an updated threshold may falsely indicate an error in the threshold value. In some embodiments, dynamic threshold value registers 312 are configured to mask the ECC bits such that a host or other external device can proceed without regard to the ECC bits. Alternatively, when an erroneous ECC is detected (e.g., by the host or other external device), the host or other external device may be configured or programmed to ask the user whether to ignore the erroneous thresholds. In a further embodiment, ECC block 340 in CPU 110 can calculate a new ECC for updated thresholds and add the new ECC to threshold data in registers 312.

At least some of the thresholds stored in dynamic threshold registers 312 have a value based on the value of a second operating parameter that is different from the operating parameter data being monitored (e.g., data stored in one of parameter registers 308). For example, the parameter data being monitored may include one or more of a voltage (e.g., a bias voltage, a regulated voltage [e.g., a voltage from a regulator, a step-up or a step-down circuit, etc.], a common mode voltage of a data signal received from an optical receiver, etc.), a bias current applied to a laser and/or modulator, an optical power (e.g., a transmitted optical digital power, a received optical digital power, a received optical video power, etc.), a radio-frequency (RF) output power, a modulation amplitude, a modulation frequency, a gain (e.g., provided by a TIA, an AGC loop, a limited amplifier, etc.), channel spacing(s), a laser frequency and/or a laser wavelength. The data may represent different instances or samples of the same parameter (e.g., voltage or temperature), either over time or from different sources. As an example, voltage data stored at one memory location may represent an average, summation, or other mathematical calculation (e.g., minimum/maximum determinations) of voltage data stored in other memory location(s). The second operating parameter may be a laser temperature, a module temperature, an optical receiver temperature, a voltage (selected from the above list for the monitored operating parameter data), a bias current, an amplifier gain (selected from the above list for the monitored operating parameter data), a modulation frequency, or time. In any case, the second parameter is different from the first parameter being monitored, and the value of the first parameter changes as a result of a change in the second parameter, as discussed below in greater detail.

Each of dynamic threshold registers 314 may store a plurality of thresholds (or ranges of parametric data) corresponding to each of a plurality of given operating parameters for use in calculating a corresponding number of operational status indications (e.g., alarms and/or warnings). Such thresholds can include (i) a high threshold and a low threshold (e.g., for an operating voltage or supply voltage), (ii) a warning threshold and an alarm threshold (e.g., for a laser temperature, optical receiver temperature, etc.), and (iii) a low warning threshold, a low alarm threshold, a high warning threshold, and a high alarm threshold. In one example, a "warning" status indication may indicate an operable system, but in which the system does not ensure or guarantee continued operability. An "alarm" status indication may represent a possible imminent shutdown of the system. Thus, the status indications may indicate that the system is at risk of faulty operation or shutdown due at least in part to the associated operational parametric data crossing the designated threshold in a predetermined direction. For example, when the value of a measured operating parameter (e.g., parametric data corresponding to an operating condition of the transceiver) is greater than or equal to a high warning threshold but below a high alarm threshold, a first corresponding operational status indicator or state may indicate a high warning status (with a corresponding indication, such as an interrupt or a flag, being sent to a host or other device in the network). Similarly, when the measured operating parameter has a value that is greater than the high alarm threshold, a second corresponding status indicator or state may indicate a high alarm status (with a corresponding indication, such as an interrupt or a flag, being sent to a host or other device in the network).

The thresholds may be stored in memory as numerical values. For example, when the first operating parameter is a bias current, the initial target value may be 50 mA, and the initial thresholds (at an initial value of a second monitored parameter, e.g., a laser temperature of 25° C.) may be equal to 40 mA (a "low alarm" threshold), 45 mA (e.g., a "low warning" threshold), 55 mA (e.g., a "high warning" threshold), and 60 mA (e.g., a "high alarm" threshold). However, when the second operating parameter (e.g., laser temperature) crosses a predetermined threshold (e.g., 75° C.), a second plurality of threshold values may be used for the bias current. For example, when the temperature of the laser reaches 75° C., the target bias current may change to 100 mA, and the threshold values may change to 80 mA (e.g., a "low alarm" threshold), 90 mA (e.g., a "low warning" threshold), 110 mA (e.g., a "high warning" threshold), and 120 mA (e.g., a "high alarm" threshold). Additionally, in some embodiments, intermediate target values and thresholds may be determined and used at corresponding intermediate temperatures (e.g., at a temperature of 40° C., 50° C., 60° C., 70° C., etc.).

In other embodiments, the thresholds are stored in memory as percentages (e.g., as percentage differences between an initial or predetermined target value) for an initial value of a second parameter. For example, for a given target value of an operational parameter at the initial value of the second operating parameter, the alarm thresholds may represent about ±10% of the initial value, while the warning thresholds may represent about ±5% of that target value. Alternatively, the alarm thresholds may represent about ±20%, ±30%, ±40%, etc. of the initial value, while the warning thresholds may represent about ±10%, ±15%, ±20%, etc. of that target value, respectively. In general, the warning thresholds are less than the corresponding alarm thresholds. At a predetermined value of the second parameter, the percentage values of the thresholds change. Using the example of the previous paragraph, when the initial target bias current is 50 mA (e.g., at an initial [monitored] laser temperature of for example 25° C.), the alarm thresholds may represent about ±20% of the target bias current, while the warning thresholds may represent about ±10% of the target bias current. However, when the monitored temperature increases to about 75° C., the high warning threshold may change to about 120% of the target bias current (which remains at 50 mA), the high alarm threshold may change to about 140% of the target bias current, the low warning threshold may change to about 80% of the target bias current, and the low alarm threshold may change to about 60% of the target bias current. Such thresholds may be stored as a second set of parameter values in dynamic threshold value registers 312. The initial target bias current remains constant through the entire operating temperature range. At intermediate temperatures, percentages for the thresholds may also be changed. Thus, in such an embodiment, as the monitored temperature increases, the values of the thresholds that should adapt to changes in operating conditions do change to correspond with safe and/or more optimal values at the changed operating condition(s).

Additionally, in further embodiments, as the monitored temperature decreases, the values of the thresholds also decrease to correspond with safe and/or appropriate operational ranges at the decreased temperature. For example, when the target bias current is 100 mA (e.g., at a laser temperature of, for example, 75° C.), the warning thresholds may be 90 mA and 110 mA, and the alarm thresholds may be 80 mA and 120 mA. However, when the monitored temperature decreases below 65° C., a new set of thresholds may be used in which the warning thresholds are 80 mA and 100 mA, and the alarm thresholds are 70 mA and 110 mA. Alternatively, if percentages are used, the new set of thresholds may include a high warning threshold of 100% of the target bias current, a high alarm threshold of 110% of the target bias current, a low warning threshold of 80% of the target bias current, and a low alarm threshold of 70% of the target bias current. In the percentage-based embodiment, the target bias current remains constant at 50 mA.

For the embodiments discussed above, when a predetermined condition is met and an updated set of thresholds different from a prior set of thresholds is to be used, pointers can be used to indicate one or more different addresses where the updated set of thresholds are stored. In some embodiments, when the predetermined condition is met, the new and/or updated set of thresholds can be calculated and reprogrammed into the same registers via bus 325 (e.g., the set of registers storing the previous set of thresholds).

As mentioned above, comparator 306 may compare a percentage variance from the target parameter value to percentage differences corresponding to the thresholds. For example, assuming a target bias current of 50 mA, a monitored parameter value of 52 mA would result in a calculated percentage variance of +4%. Similarly, a first monitored operating parameter value of 46 mA would result in a calculated percentage variance of −8%. Once the percentage variance is determined (e.g., by CPU 110), the value of the percentage variance is provided to comparator 306 (e.g., via bus 304). Comparator 306 then compares the percentage variance to the thresholds from dynamic threshold value registers 312, stored as percentage differences from the target value (e.g., ±10%, ±20%, etc.). As discussed above, the percentage differences (or thresholds) determined from a (monitored) second operating parameter and can be retrieved from one of registers 312. A result of the comparison can then be provided to controller 302. For example, assuming alarm thresholds representing about ±20% of a target bias current and warning thresholds representing about ±10% of the target bias current, if the calculated percentage variance is +13% of the target value, then a high warning indication is generated. Alternatively, if the calculated percentage variance is −24%, then a low alarm indication is generated. In either case, the resulting status indication is then provided to one or more of status indication registers 316 (e.g., 318-0, 318-1, 318-2, . . . 318-N) via bus 326. The resulting status indication from status indication registers 316 is then provided via data memory output signal/bus 222 to interface controller 114, and can be provided to a host or other external device. Comparator 306 provides an output (e.g., a comparison result) via bus 324 to one or more of status indication registers 316, which can then be provided to interface controller 114 such that a status indication and a comparison result are both provided to an external device.

The present circuitry can also be used to determine numerical differences and status indications in embodiments utilizing numerical values. For example, instead of providing a percentage variance to comparator 306, a numerical difference between a monitored parameter value and a target value can be provided to comparator 306. Numerical threshold values can then be provided to comparator 306 and compared to the numerical difference. A result of the comparison, and a corresponding status indication, can then be provided to one or more of status indication registers 316 (as discussed above), and subsequently to interface controller 114. In either embodiment, such as those discussed above using percentage variances or numerical differences, an optical transceiver according to the present invention may include a digital diagnostic monitoring interface (DDMI) that reports values and/or states of various parameters (see, e.g., U.S. patent application No. 13/427,691, filed Mar. 22, 2012, the relevant portions of which are incorporated by reference herein).

Thus, the present hardware enables operational status indications to reflect changes in operational or environmental conditions, and inaccurate status indications that might otherwise reflect malfunctioning hardware or an end of life (EOL) condition can be avoided. Additionally, by utilizing thresholds that change as a function of an operating parameter (e.g., temperature, bias current, time, etc.) during operation, the present invention can control operation of an optical transceiver more reliably, identify a current operating state of the transceiver more accurately, and provide more valuable and/or useful information to the user in comparison to conventional transceivers.

A First Exemplary Method of Monitoring Operational Parameters in an Electronic Device In one example, a method of monitoring one or more parameters in an electronic device can include (i) monitoring a first operating parameter related to operation of the electronic device to determine a first parameter value, (ii) calculating a difference between the first parameter value and a predetermined (e.g., target) value for the first operating parameter, (iii) monitoring a second operating parameter on which thresholds for operational warnings and/or alarms are based to determine a second parameter value, (iv) updating or changing the thresholds based on a predetermined change or event in the second parameter value, (v) comparing the difference between the first parameter value and the predetermined value to at least some of the updated or changed thresholds, and (vi) generating a corresponding one of the operational warnings and/or alarms when the difference crosses at least one of the updated or changed thresholds in a predetermined direction.

Figure 4:
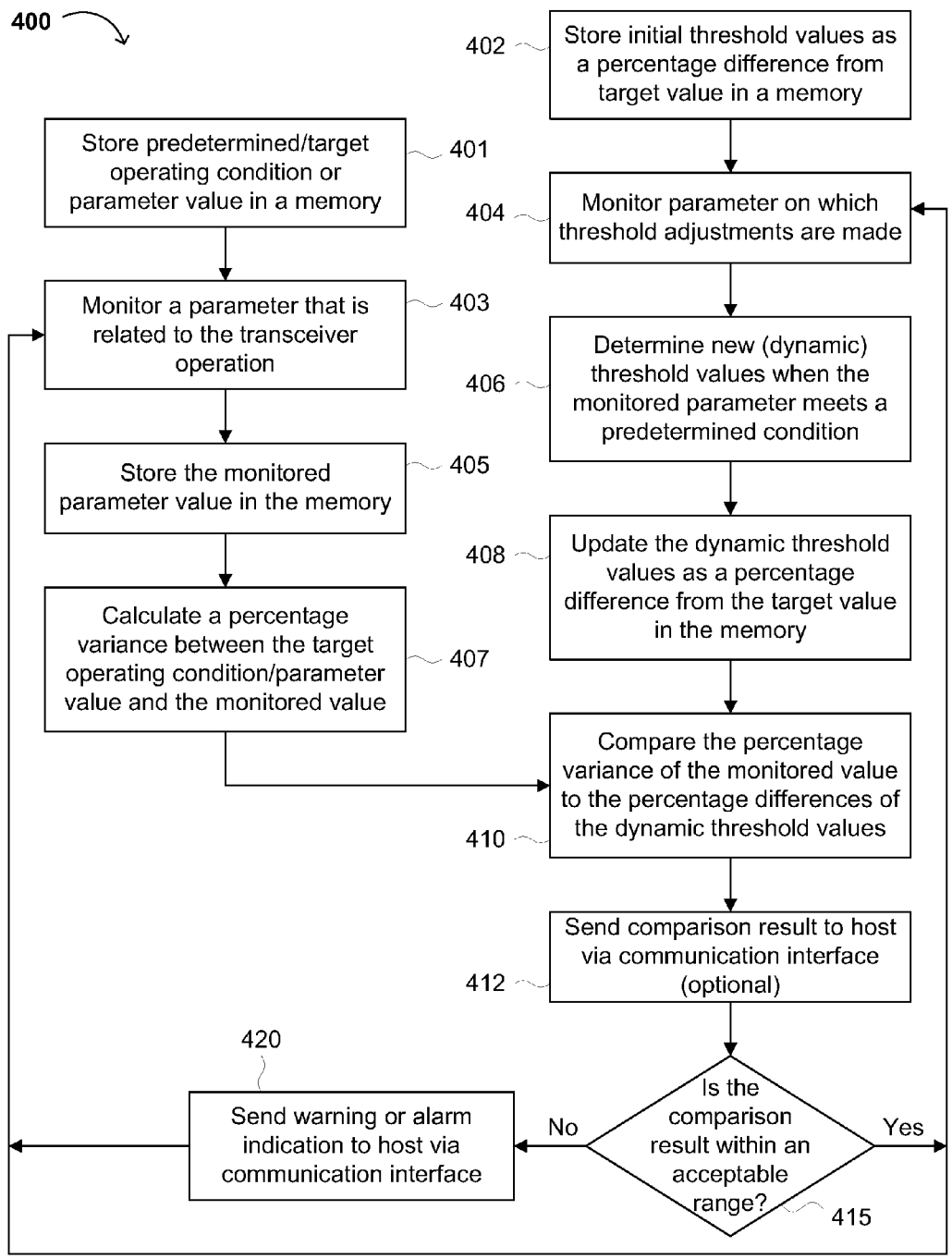
FIG. 4 is a flow diagram showing an exemplary method of monitoring one or more operating parameters in accordance with embodiments of the present invention.

FIG. 4 illustrates an exemplary method 400 of monitoring one or more parameters in an electronic device in accordance with embodiments of the present disclosure. The present method 408 generally uses a fixed first operating target value and thresholds that change as a function of a second monitored parameter (e.g., laser temperature or time). The changing or dynamic thresholds can reflect changes in operational or environmental conditions, and inaccurate status indications that might otherwise reflect malfunctioning hardware or an end of life (EOL) condition can be avoided. Additionally, once the target values and thresholds are determined (e.g., stored in a memory in an optical transceiver), further user input is not required.

The method begins at 401, and a predetermined or target operating condition or parameter value for a given parameter is stored in memory. For example, the predetermined or target value can be stored in a register 312 in data memory 112 in FIG. 3. In some embodiments, as discussed above, the target operating condition or parameter value represents a target bias current. At 403, a first parameter related to transceiver operation is monitored. The first operating parameter may comprise any one or more of the parameters discussed above (e.g., a bias voltage, a bias current, a gain, etc.). Monitoring the first parameter may comprise CPU 110 accessing the parametric data from a first ADC (e.g., ADC output register 202 in FIG. 2). In some embodiments, and referring to FIG. 2, a timer (not shown) that may be included in CPU 110 provides an enable signal to ADC 106 such that a value of the first operating parameter is sampled or accessed when the enable signal is received.

At 405, the monitored (e.g., sampled or accessed) parametric data is stored in memory. For example, parametric data can be transferred from a first ADC (e.g., ADC 106 in FIG. 2) to a suitable location (e.g., a location determined or allocated by CPU 110) in data memory 112 (e.g., in parameter registers 308 in FIG. 3). Referring back to FIG. 4, at 407, a percentage variance between the target value and the monitored parameter value is calculated. For example, if the target value is 50 mA for the first parameter (e.g., a bias current), a monitored parameter value of 59 mA would result in a calculated percentage variance of +18%. Similarly, a first monitored operating parameter value of 42 mA would result in a calculated percentage variance of −16%.

At 402, initial thresholds are stored in memory (e.g., one or more of registers 312 in data memory 112 in FIG. 3). The initial thresholds may include low and high warning thresholds and low and high alarm thresholds. Alternatively, the initial thresholds may include a high threshold and a low threshold (e.g., for an operating voltage or supply voltage), or a warning threshold and an alarm threshold (e.g., for a laser temperature, optical receiver temperature, etc.), as discussed above with respect to FIG. 3. For example, warning thresholds may be set at percentage differences of about ±10% from the target value, and alarm thresholds may be set at percentage differences of about ±20% from the target value. In other embodiments, the percentage differences may be set at ±15% (e.g., warning thresholds) and ±30% (e.g., alarm thresholds), or ±20% (e.g., warning thresholds) and ±40% (e.g., alarm thresholds). In any embodiment, the initial thresholds can be set at any value that reflects or results in successful operation of the transceiver.

At 404, a parameter on which adjustments to the thresholds are made (e.g., a second operating parameter) is monitored. As discussed above with respect to FIG. 3, the second operating parameter may include a temperature (e.g., a laser temperature, a module temperature, an optical receiver temperature, etc.), a voltage (e.g., a bias voltage, a supply voltage, a regulated voltage, etc.), a bias current, an amplifier gain, a modulation frequency, or time. In any case, the second operating parameter is different from the first operating parameter for each of the first operating parameters having dynamic thresholds, as shown in Table 1 below.

TABLE 1

| First Operating Parameter | Second Operating Parameter |
|---|---|
| Optical Bias Current | Laser Diode Temperature |
| Laser Output Power | Laser Diode Bias Current |
| Laser Frequency | Time |
| Bias Voltage | Chip Temperature |

Similar to the first operating parameter, the second operating parameter can be periodically sampled using an ADC (e.g., the same ADC or a second ADC different from the first ADC that supplies the first parameter). In the latter case, data for the second parameter can be transferred from the second ADC to a suitable location in data memory 112 (e.g., in parameter registers 308). At 406, new threshold values are determined when the parametric data for the second operating parameter crosses a predetermined threshold or satisfies a predetermined condition.

In one embodiment, the second operating parameter is the laser temperature, the first operating parameter is the bias current to the laser, and the initial target bias current is 50 mA at 25° C. The initial set of thresholds is equal to ±10% (e.g., warning thresholds) and ±20% (e.g., alarm thresholds) from the target value. When the second operating parameter meets a predetermined condition (e.g., 75° C.), the thresholds (e.g., the ±10% and ±20% thresholds) are replaced with a different set of thresholds. This concept can be characterized as "dynamic thresholds." When the replacement thresholds are stored in dynamic threshold value registers 312, the corresponding registers can be accessed using a pointer or address that corresponds to the increased temperature. Thus, for example, at 75° C., a new set of thresholds for bias current may be used in which the high warning threshold is 120% of the target bias current, a high alarm threshold is 140% of the target bias current, a low warning threshold is 80% of the target bias current, and a low alarm threshold is 60% of the target bias current. Alternatively, a new set of thresholds may be used in which the high warning threshold is 115% of the target bias current, a high alarm threshold is 130% of the target bias current, a low warning threshold is 85% of the target bias current, and a low alarm threshold is 70% of the target bias current. The target bias current remains at 50 mA throughout an entire operating temperature range. If the second operating parameter has not met the predetermined condition (e.g., 75° C.), then the corresponding new set of thresholds is not accessed or utilized. Alternatively, the new thresholds can be determined as a function of a change in the second operating parameter value (e.g., a temperature value). For example, for every increase in temperature of about 10° C. (e.g., from 25° C. to 35° C.), the thresholds of the bias current may increase by about 20%. For example, using the values of the previous paragraph, with a laser diode temperature increase to 35° C., the thresholds can increase to +30% (e.g., a high warning threshold), +40% (e.g., a high alarm threshold), +10% (e.g., a low warning threshold) and −10% (e.g., a low alarm threshold).

At 408, the dynamic threshold values are updated. For example, if the initial threshold values were stored at a location in data memory 312 (e.g., dynamic threshold value register 314-0), then CPU 110 can access the new threshold values stored at a different location in data memory 312 (e.g., dynamic threshold value register 314-1). Alternatively, new threshold values can be written into the register(s) that were used for the previous set of thresholds. At 410, the percentage variance of the monitored value is compared to the percentage differences of the thresholds. For example, referring to the ±10% and ±20% threshold values discussed above, with a bias current target value of 50 mA and a first monitored operating parameter value of 52 mA, the percentage variance of +4% is compared to the percentage differences (e.g., the ±10% and ±20% thresholds at 25° C.).

At 412, a result of the comparison may be automatically provided to an external device (e.g., a host) and/or the network including the optical transceiver. For example, the comparison result can be provided to an interface controller, such as interface controller 114 in FIG. 3. In one embodiment, the comparison result can include the difference between the percentage variance and the percentage differences. Alternatively, using the percentage variance of +4% and the ±10% and ±20% thresholds discussed above, the comparison result may include a flag or state indicating that the bias current is in a normal range.

At 415, the method determines if the comparison result is within an acceptable range (e.g., if an alarm or warning should be generated). Using the exemplary embodiment discussed above in the previous paragraph, since the +4% percentage variance is less than the +10% high warning threshold, and greater than the -10% low warning threshold, no warning or alarm is generated. That is, the comparison result is within an acceptable (or normal) range, and the method returns to 403 and 404. Alternatively, when the comparison result is not within an acceptable range, the method proceeds to 420, where a warning or an alarm status indication is provided to a host (e.g., host 102 in FIG. 1) or other external device via a communication interface (e.g., interface controller 114 in FIG. 1). For example, utilizing the threshold values from the previous example (e.g., ±10% warning thresholds and ±20% alarm thresholds), a monitored percentage variance of +22% of the target value results in a high alarm indication. In one embodiment, the alarm status indication is automatically provided to the host or external device.

In an alternative embodiment, using the same percentage differences, but with a percentage variance of +11%, a high warning status indication may be automatically provided to the host or external device since the percentage variance is greater than the high warning threshold of +10%. In either embodiment, after the operational status indication is generated (e.g., a warning and/or alarm) at 420, the method returns to monitoring parametric data relating to the transceiver operation at 403 and 404.

As discussed above, the rates at which parametric data are accessed and stored at allocated memory locations, as compared to rates at which adjustments are made to the thresholds for the parametric data, are variable and not necessarily equal in particular embodiments. Parametric data can be accessed and stored in allocated memory at a rate that is independent of the rate at which thresholds are determined, stored and/or accessed in the allocated memory. Stated differently, the flow including 401, 403, 405 and 407 can occur at one rate, while the flow including 402, 404, 406, and 408 can occur at a different rate. Alternatively, the two rates may be the same, such as when parametric data is obtained or accessed on demand in response to a host request. Thus, the present method provides a user with the option of monitoring operating parameters in an optical transceiver system with little or no input required. That is, the monitoring of the threshold adjustments and the generation of status indications (e.g., alarms and warnings) is performed automatically. Thus, a first operating parameter can be monitored as a function of a second operating parameter, and inaccurate status indications that might otherwise reflect malfunctioning hardware or an end of life (EOL) condition can be avoided.

A Second Exemplary Method of Monitoring Operating Parameters in an Electronic Device A further aspect of the invention relates to a method of monitoring one or more parameters in an electronic device, comprising (i) monitoring a first operating parameter related to operation of the electronic device to determine a first parameter value, (ii) monitoring a second operating parameter on which thresholds are based to determine a second parameter value, the second operating parameter being different from the first operating parameter, (iii) updating or changing the thresholds based on a predetermined change or event in the second parameter value, (iv) comparing the first parameter value to at least some of the updated or changed thresholds to produce a result, and (v) generating an alarm and/or warning when the result crosses at least one of the updated or changed thresholds in a predetermined direction. In further embodiments, the method includes sending the alarm and/or warning to a host or other external device.

Figure 5:
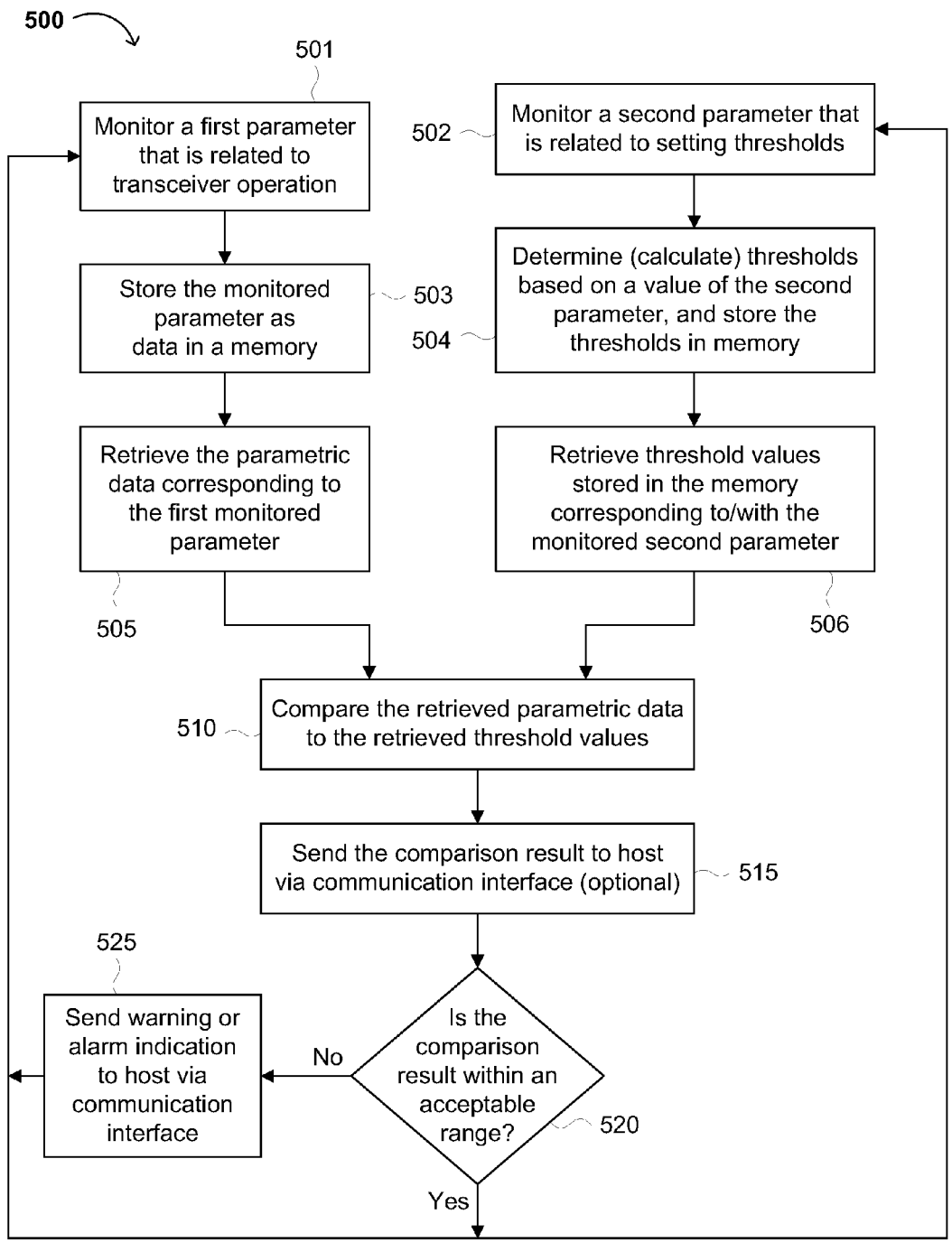
FIG. 5 is a block diagram showing a second exemplary method of monitoring one or more operating parameters in accordance with embodiments of the present invention.

FIG. 5 illustrates an exemplary method 500 of monitoring one or more parameters in an electronic device in accordance with embodiments of the present disclosure. The present method can be used to compare numerical values of monitored parameters to numerical threshold values. A result of the comparison and operational status indications can be automatically provided to a host. The method begins at 501, and a first operating parameter related to transceiver operation is monitored. In some embodiments, the first operating parameter is similar to that discussed above with respect to FIG. 4. That is, the first operating parameter may comprise one or more of the parameters discussed above (e.g., a voltage, a bias current, a gain, etc.).

At 503, the first operating parameter is stored as data in a memory. For example, and referring to FIG. 3 the first monitored parameter can be stored in one or more registers 308 in data memory 112. Generally, a predetermined target value of the first operating parameter is also stored in memory (e.g., in one of the registers 310 in parameter registers 308). At 505, the parametric data corresponding to the first operating parameter is retrieved from memory. For example, a CPU (e.g., CPU 110 in FIG. 2) can retrieve the parametric data corresponding to the first operating parameter from parametric data registers (e.g., parameter registers 308 in FIG. 3).

Separately, at 502, a second operating parameter related to threshold determinations is monitored. The second operating parameter can be similar to that discussed above with respect to FIG. 4. For example, the second operating parameter may comprise one or more of the parameters discussed above (e.g., a voltage, a temperature, time, etc.). In any case, the second operating parameter is generally different from the first operating parameter for each of the first operating parameters, as shown in Table 1 discussed with respect to FIG. 4 above.

At 504, thresholds are determined or calculated based on the value of the second operating parameter, and the thresholds are stored in memory. The memory in which the data relating to both the first and second operating parameters is stored can be the same as or similar to that discussed above with respect to FIGS. 2-4. Determination or calculation of the thresholds is dependent on the value of the second operating parameter. For example, in one embodiment, when the laser temperature (e.g., the second monitored parameter) is 25° C., the target bias current value (e.g., first operating parameter)

may be 50 mA. At or around this temperature, a high warning threshold may be 55 mA, a high alarm threshold may be 60 mA, a low warning threshold may be 45 mA, and a low alarm threshold may be 40 mA. Such thresholds may be acceptable for an operating laser temperature range of from about 0-15° C. to about 35-50° C.

However, when the laser temperature increases to a predetermined value (e.g., 75° C.), then the values of the thresholds may be changed or updated. For example, the updated threshold values may include a high warning threshold value of 110 mA, a high alarm threshold value of 120 mA, a low warning threshold value of 90 mA, and a low alarm threshold value of 80 mA. Thus, depending on the value of the second operating parameter, different thresholds can be determined, stored, and used.

At 506, the thresholds corresponding to the second operating parameter are retrieved from memory. A CPU (e.g., CPU 110 in FIG. 2) can retrieve thresholds corresponding to the current or most recently sampled second operating parameter from dynamic threshold value registers 312. For example, using the values discussed in the previous paragraph, when the laser temperature is 75° C., the updated threshold values of 80 mA, 90 mA, 110 mA, and 120 mA are retrieved from memory.

At 510, the retrieved parametric data corresponding to the first operating parameter is compared to the thresholds retrieved at 506. For example, a comparator (e.g., comparator 306 in FIG. 3) may receive the first parametric data and the thresholds from memory, compare the parametric data to the thresholds, and provide a result of the comparison. The method may compare the monitored parameter to one threshold, a subset of the thresholds, or all of the thresholds. The comparison result may be a state or a flag providing a normal or acceptable status indication, a high or low status indication, a warning or alarm status indication, or a combination thereof. Thus, the flags or states may be represented by indicators such as or corresponding to "NORMAL," "OVER LIMIT," "UNDER LIMIT," "WARNING," "ALARM," and high and low variations of the warning and alarm indications (e.g., "LOW WARNING," "HIGH ALARM," etc.).

Optionally, at 515, a result of the comparison can be provided (e.g., automatically) via a communication interface to an external device (e.g., a host) in the network including the optical transceiver. That is, a flag or state indicating the relative value of the monitored first parameter in comparison to the threshold values can be provided to the host or other external device. At 520, the method determines whether the result of the comparison is within an acceptable range. In one example, if the value of the first parameter is 52 mA and the low warning threshold is 45 mA and the high warning threshold is 55 mA, the method will determine that the result is within an acceptable range. The method then automatically returns to monitoring the first and second parameters at 501 and 502.

However, in some situations, the method may determine that the result of the comparison is not within an acceptable range. For example, a first parameter value of 57 mA may be compared to thresholds of 40 mA, 45 mA, 55 mA, and 60 mA. The method will determine that the first parameter value is greater than the high warning threshold of 55 mA, but less than the high alarm threshold of 60 mA. As a result, a high warning indication is generated. Alternatively, a first parameter value of 63 mA may be read and then compared to the thresholds (e.g., 40 mA, 45 mA, 55 mA, and 60 mA). In such an embodiment, a high alarm indication is generated since the parameter value of 63 mA is greater than the high alarm threshold of 60 mA. More specifically, when a result of the comparison is not within an acceptable range, and at 525, a corresponding warning or alarm indication is sent to an external device (e.g., a host) in the network including the optical transceiver. The indication may be a flag or a state (see, e.g., U.S. patent application Ser. No. 13/348,599, filed Jan. 11, 2012, the relevant portions of which are incorporated by reference herein) and may be sent automatically. After the warning or alarm indication is sent, the method returns to monitoring the first and second operating parameters at 501 and 502.

Thus, the present method provides an option to monitor one or more operating parameters in an optical transceiver using numerical thresholds. The monitoring of parameters, adjustments of thresholds, and generation of status indications (e.g., alarms and warnings) may be performed automatically. In particular, a first operating parameter can be monitored as a function of a second operating parameter (i.e., changing operational conditions), and inaccurate status indications that might otherwise reflect malfunctioning hardware or an end of life (EOL) condition can be avoided.

Figure 6:
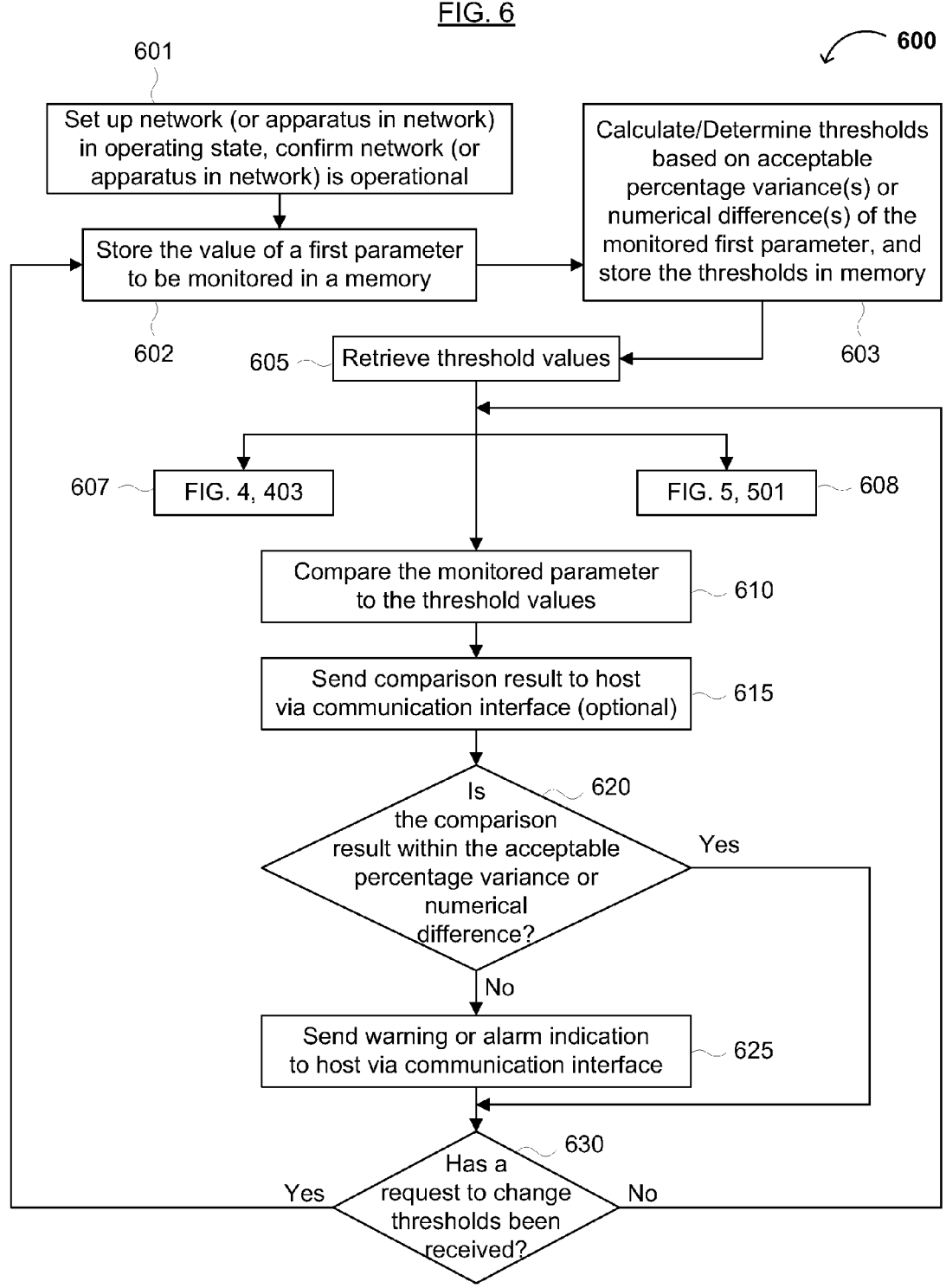
FIG. 6 is a block diagram showing a third exemplary method of monitoring one or more operating parameters in accordance with embodiments of the present invention.

A Third Exemplary Embodiment for Monitoring Operating Parameters in an Optical Transceiver FIG. 6 illustrates a third exemplary method 600 of monitoring one or more operating parameters in an electronic device in accordance with embodiments of the present disclosure. The method 600 utilizes "known good" operating parameter values that are established once an optical network including the optical transceiver is operating correctly. That is, once the optical network is set up and has reached a confirmed working operational state, target values for various parameters can be based on (e.g., equal to) the "known good" parameter values in the working network, and initial threshold values can be calculated or defined from the "known good" values. Thereafter, the parameters can be monitored. If the transceiver or network reaches a different operating state (e.g., one resulting from a change in one or more parameter values, such as temperature or time), the method can automatically change the threshold values (e.g., via dynamic threshold value controller 302 in FIG. 4) to minimize or avoid inaccurate status indications.

The method 600 can begin at 601, where a network (or an apparatus in a network) is set up. When the network is operating correctly (e.g., is functional), network and/or transceiver performance may be optimized. For example, network and/or transceiver functionality may be confirmed by waiting a predetermined period of time to ensure that parameter values and/or device performance is stable. If the parameter values do not vary significantly over the predetermined period of time, the network and/or transceiver may be considered to be functional and stable. The method may also test transmissions over the network to ensure correct processing of the transmissions.

At 602, once the network performance is confirmed and "known good" states (e.g., including associated parameter values) are established, the value(s) of one or more first parameters to be monitored are stored in a memory. The first operating parameters can include one or more of the parameters discussed above with respect to FIGS. 3-5 (e.g., a voltage, a bias current, an optical power, etc.). The values stored in memory may represent the steady state or "normal" operating values of the various first operating parameters. The values may be stored in parameter registers 308 (e.g., 310-0, 310-1, etc.) in data memory 112.

At 603, thresholds based on acceptable percentage variance(s) of the monitored first parameter or numerical ranges around the stored first parameter value can be determined or calculated, and the values of the thresholds stored in memory.

The initial thresholds can also be defined by a user (e.g., via a host in communication with a graphical user interface in communication with the interface controller 114 in FIGS. 2-3). Additionally, the thresholds can be stored in one or more registers (e.g., one or more of threshold registers 312 in data memory 112 in FIG. 3). In embodiments utilizing percentage thresholds, the initial warning thresholds may have a value between 5-25%, and the alarm thresholds may have a value between 10-50%. In any case, when the thresholds are calculated or determined as a percentage, the absolute value of the high and low alarm thresholds is greater than the absolute value of the corresponding high and low warning thresholds. For example, warning thresholds may be set at percentage differences of about ±10% from the target value, and alarm thresholds may be set at percentage differences of about ±20% from the target value. Embodiments may also use acceptable numerical differences from the target value. In any embodiment, the initial thresholds can be set such that accurate operational status indications can be generated.

At 605, the threshold values are retrieved from memory. A CPU (e.g., CPU 110 in FIG. 2) can retrieve the threshold values corresponding to the second operating parameter from one or more registers (e.g., one or more threshold registers 312 in data memory 112 in FIG. 3). In a first embodiment, after the threshold values have been retrieved, the method proceeds to 607, where the method of FIG. 4 is performed, starting at 403. That is, a first parameter is monitored, and the parameter value is stored in memory. A percentage variance between a target value and the monitored first parameter value is then calculated. After the percentage variance has been calculated, the method compares the percentage variance to the thresholds (e.g., percentage differences that are dependent on a monitored second parameter value), and optionally sends a result of the comparison to an external device. The thresholds can be updated when a predetermined condition is met. If the method determines that the comparison result is not within an acceptable range, an alarm or warning indication can be generated as a result of the comparison. After the alarm or warning if provided to the external device, or if the result is determined to be within an acceptable range, the method returns to monitoring the first and second parameters (see FIG. 4, e.g., at 403 and 404).

Alternatively, in a second embodiment, after the threshold values have been retrieved, the method of FIG. 5 is performed, starting at 501. For example, the method may monitor a first parameter and store the monitored parameter as data in a memory. The parameter values may be retrieved from memory and compared to the retrieved threshold values (e.g., threshold values that are a function of a second operating parameter). The threshold values may be stored as numerical differences from the first parameter. Optionally, a result of the comparison may be sent to an external device and/or the network including the optical transceiver. If the comparison result is not within an acceptable range, an alarm or warning may be sent to the external device. After the alarm or warning is sent to the external device, or if the method determines that the result is within an acceptable range, the method returns to monitoring the first and second parameters (see FIG. 5, e.g., at 501 and 502).

Alternatively, in a third embodiment, after the threshold values are retrieved from memory, the method proceeds to 610, where the monitored parameter values are compared to the retrieved threshold values (e.g., percentage differences or numerical differences). At 615, a result of the comparison is (optionally) provided to an external device (e.g., a host) in the network including the optical transceiver. In one embodiment, the result of the comparison may be provided automatically. At 620, the method determines whether the comparison result is within an acceptable range (e.g., if an alarm or warning should be sent). If the comparison result is within an acceptable range, no alarms or warnings are sent, and the method proceeds to 630. For example, the method may determine that a percentage variance is between high and low warning thresholds, and therefore, within an acceptable range. However, if the comparison result is not within an acceptable range, the method sends a corresponding status indication (e.g., a high or low warning or alarm) to a host or external device at 625. The status indication may be automatically provided to an external device in the network including the optical transceiver (e.g., via an interface controller). After the status indication is sent, the method proceeds to 630.

At 630, the method determines whether a request to change thresholds (e.g., percentage variance[s] or numerical difference[s]) has been received. The request can be received, for example, by an interface controller (e.g., interface controller 114 in FIG. 4) in communication with an external device (e.g., a host), which in turn, may be in communication with a user through a GUI. Alternatively, the threshold values may be automatically changed by an internal request from dynamic threshold value controller 302 (e.g., based on a value of a second monitored operating parameter) or upon a new request (e.g., an instruction to store "known good" values of the operating parameters of the optical transceiver). That is, in one embodiment, the value of a second operating parameter (e.g., the same as or similar to those discussed above with respect to FIGS. 3-5) may be used to adjust or update the threshold values. Thus, when a value of the second predetermined parameter meets a predefined condition or value, the threshold values may be updated or replaced, as discussed above with respect to FIGS. 3-5. Alternatively, a request to latch new or updated "known good" parameter values based on current operating conditions, or to calculate or determine new thresholds may be received (e.g., from a host or external device).

If a request to change thresholds has been received, the method returns to storing first parameter values in memory at 602. If no such request has been received, the method returns to (1) monitoring a parameter related to transceiver operation at 403 (FIG. 4) or 501 (FIG. 5), or (2) comparing the first monitored parameter values to the retrieved threshold values at 610. Thus, the present method provides users with an option to determine target values and threshold values when the optical network is in a confirmed or "known good" operational state or, as discussed above, the threshold values can be updated to minimize or avoid inaccurate status indications.

An Exemplary Method of Updating Thresholds that Include Error Checking Code

Figure 7:
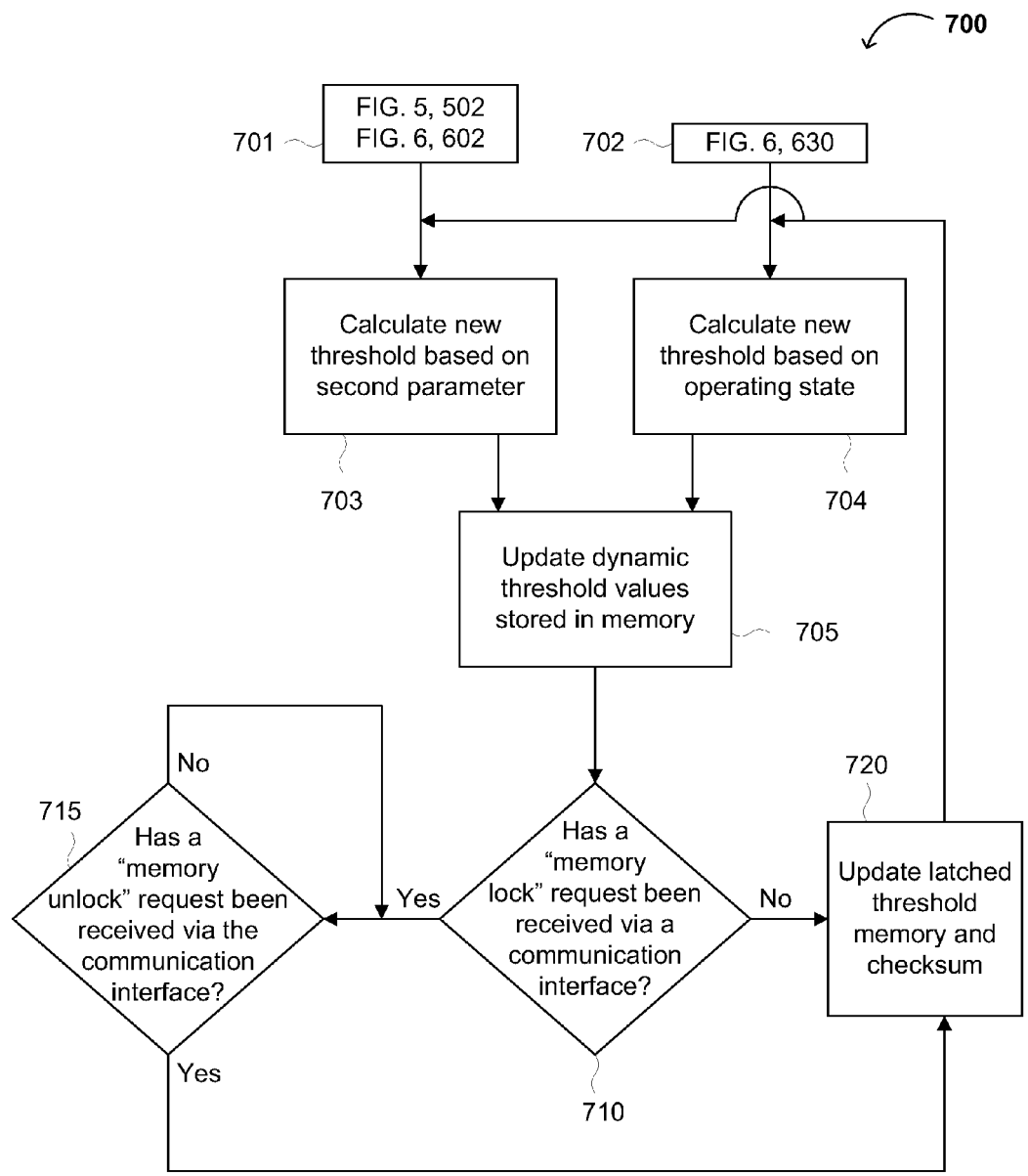
FIG. 7 is a block diagram showing an exemplary method of error checking threshold information and/or values in accordance with embodiments of the present invention.

FIG. 7 illustrates an exemplary method 700 of updating thresholds that include error checking code in accordance with embodiments of the present invention. The method 700 allows updated threshold values stored in memory to be used even though error checking code (ECC) appended thereto may be erroneous. More specifically, threshold values stored in one or more dynamic threshold value registers 312 (FIG. 3) may include an ECC calculated thereon and appended thereto. Prior to updating the threshold values, the combined threshold value and ECC can be copied and stored in memory (e.g., one or more latched dynamic threshold value and ECC registers 317 in FIG. 3). The thresholds may be read (e.g., from threshold registers 312) by a host or other external device, which may perform an "external" ECC calculation on the retrieved thresholds. The host or other external device can then compare the ECC read from dynamic threshold value registers 312 to the external ECC to confirm that the retrieved thresholds are correct.

When the thresholds are updated or changed, the new thresholds are stored in registers 312, and the threshold values can be read by the host or other external device and applied to the most recent parametric data. However, a new ECC may not necessarily be calculated thereon or appended thereto. Therefore, the host or other external device may calculate an ECC different from the ECC read from registers 312, since the stored ECC reflects a value based on a previous threshold value. Method 700 allows the threshold values stored in memory to be latched so that updated threshold values can be applied to current parametric data, including instances where the ECCs appended to the updated threshold values were calculated on previous threshold values. In a further embodiment, the ECC may be recalculated on the new threshold values (e.g., after receipt of a "memory unlock" command) and stored in dynamic threshold value registers 312.

In a first embodiment, the method 700 may begin at 701 and monitor a second parameter related to threshold determination (see, e.g., 502 in FIG. 5, or 602 in FIG. 6). For example, the second operating parameter can be the same as or similar to those discussed above with respect to FIGS. 4-6 above (e.g., a temperature, a voltage, time, etc.). At 703, new or updated threshold values based on the second parameter are calculated.

Alternatively, the method 700 may begin at 702 and determine if a request to change thresholds has been received (see, e.g., 630 in FIG. 6). For example, as discussed above with respect to FIG. 6, the request may be received internally from dynamic threshold value controller 302 (e.g., based on a value of a second monitored operating parameter) or upon a new request (e.g., an instruction to store "known good" values of one or more operating parameters). When the method determines that such a request has been received, at 704, new thresholds based on a current operating state of the system (e.g., a confirmed operational network state) are calculated. In some embodiments, such as those discussed above with respect to FIG. 6, the thresholds can be equal to "known good" values that are provided when the network is in the confirmed (and optimally stable) operational state.

At 705, the threshold values stored in memory (e.g., dynamic threshold value registers 312 in FIG. 3) are updated (for example, by overwriting the threshold data stored in registers 312, or by associating a new address in the registers with the updated thresholds). In one embodiment, the thresholds may be updated automatically by an internal request from dynamic threshold value controller 302 (e.g., based on a value of a second monitored operating parameter) in FIG. 3.

At 710, the method determines if a "memory lock" or similar request has been received (e.g., via a communication interface). In various embodiments, the "memory lock" request (or similar request or command) can be received from the user, using a GUI in communication with the communication interface. If a "memory lock" request or command has not been received at 710, the thresholds can continue to be updated. That is, data can continue to be written to threshold registers 312, or a new address in the memory can be associated with the updated thresholds. In embodiments where the ECC can be used to make corrections to the threshold values, old (or corrected) threshold values can be written into threshold registers 312.

Referring back to 710 in FIG. 7, the memory lock request/command typically prevents the system from overwriting the locked registers (e.g., threshold registers 312), associating a new address with the corresponding thresholds, or in some cases, reading the contents of the locked registers. Thus, to use the current thresholds when a memory lock request has been received, the threshold values and ECC can first be copied from dynamic threshold value registers 312 into latched dynamic threshold value and ECC registers 317. When the host or other external device reads the threshold values during an assertion of the memory lock command, the transceiver provides threshold data from latched dynamic threshold value and ECC registers 317, instead of dynamic threshold value registers 312. However, because dynamic threshold value registers 312 have been updated at 705, the corresponding ECCs may not be accurate. In one embodiment, the host or other external device receiving the thresholds and ECCs can be configured to ignore erroneous ECCs (e.g., either completely or during assertion of the memory lock request). Alternatively, registers 312 can be configured to mask the ECC bits. As a result, the host or other external device can proceed without regard to the ECC bits. Alternatively, when an erroneous ECC is detected (e.g., by the host or other external device), the host or other external device may be configured or programmed to ask the user whether to ignore the erroneous ECCs.

If a "memory lock" request has been received (e.g., via a communication interface) at 710 in FIG. 7, the transceiver and system operate using the thresholds stored in registers latched dynamic threshold value and ECC 317 until a "memory unlock" request or command is received. In various embodiments, the "memory lock" request or command may prevent old thresholds from being written back into the dynamic threshold value registers 312, in the case where the host or other external device is configured to correct erroneous code using the appended ECC from registers 317. Thus, referring back to FIG. 7, as long as a "memory unlock" request is not received, the method operates using the most recent set of thresholds (and associated ECC) at 715 until a "memory unlock" request is received. Once the "memory unlock" request is received, the method updates the threshold values and ECC (e.g., a checksum, parity bit or code, or cyclic redundancy code [CRC]) in dynamic threshold value registers 312 (FIG. 3).

After the latched threshold memory and ECC (e.g., checksum) have been updated at 720, the method returns to calculating new thresholds at 704 (e.g., thresholds based on an operating state) or 703 (e.g., thresholds based on a second parameter). Thus, except for the time at 715 between receiving a "memory lock" request and receiving a "memory unlock" request, the thresholds can be continuously updated (e.g., automatically by dynamic threshold value controller 302 in FIG. 3). As a result, updated threshold values stored in a memory can be sent to a host or other external device even though error checking code (ECC) appended thereto may be erroneous. When the threshold values are updated, a "memory lock" or similar request can be sent to the memory, and ECC appended to the threshold values can also be updated. Updating the ECC appended to the updated threshold values can ensure that a calculated ECC for current threshold values is the same as that calculated by the host or other external device.

CONCLUSION/SUMMARY

Embodiments of the present invention advantageously provide an approach for generating and/or calculating operational status indicators utilizing dynamic thresholds. By utilizing the present invention, changes in the thresholds for such operational status indicators can reflect changes in operational or environmental conditions, and inaccurate status indications (e.g., that may reflect malfunctioning hardware or end of life conditions) can be avoided. Additionally, by utilizing thresholds that are a function of a second operating parameter (e.g., temperature, time, etc.) that changes during operation, the present invention can more accurately identify a current operating state of a transceiver and provide more valuable information to the user in comparison to conventional transceivers.

While the above examples include particular implementations of registers and other memory arrangements, as well as comparators and other logic, one skilled in the art will recognize that other designs and arrangements may also be used in accordance with embodiments. For example, other digital logic or elements can be used in certain embodiments. Further, one skilled in the art will recognize that other forms of signaling and/or control (e.g., current-based signaling, flag-based signaling, differential signaling, etc.) may also be used in accordance with various embodiments.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of monitoring one or more operating parameters in an electronic device, the method comprising:
    a) monitoring a first operating parameter, related to operation of said electronic device, to determine a first parameter value;
    b) using a microprocessor, microcontroller or logic circuit, calculating a difference between said first parameter value and a target value for said first operating parameter;
    c) monitoring a second operating parameter, on which thresholds for operational warnings and/or alarms for said first parameter are calculated, to determine a second parameter value, said thresholds including a percentage variance above and below the target value;
    d) using said microprocessor, microcontroller or logic circuit, updating or changing said thresholds based on a predetermined change or event in said second parameter value;
    e) comparing said difference to said updated or changed thresholds; and
    f) generating a corresponding one of said operational warnings and/or alarms when said difference crosses at least one of said thresholds in a predetermined direction.

2. The method of claim 1, wherein each of said thresholds is represented as a percentage difference from said target value.

3. The method of claim 1, further comprising providing one of said operational warnings and/or alarms to a host or other external device.

4. The method of claim 1, wherein said first operating parameter comprises at least one member of the group consisting of a regulated voltage, a bias voltage, a common mode voltage, a bias current, a transmitted optical digital power, a received optical digital power, a received optical video power, a radio-frequency (RF) output power, a modulation amplitude, a modulation frequency, an amplifier gain, a channel spacing, a laser frequency, and a laser wavelength.

5. The method of claim 1, wherein said second operating parameter comprises at least one member of the group consisting of laser temperature, module temperature, optical receiver temperature, a voltage, a bias voltage, a bias current, an amplifier gain, a modulation frequency and time.

6. The method of claim 1, wherein said thresholds comprise a low warning threshold, a low alarm threshold, a high warning threshold, and a high alarm threshold.

7. An optical transceiver, comprising:
    a) an optical receiver configured to receive optical data;
    b) an optical transmitter configured to transmit optical data;
    c) one or more memories configured to store (i) data from one or more first operational parameters of said transceiver, (ii) data from a second operational parameter different from a corresponding one of said one or more first operational parameters, and (iii) a plurality of thresholds for each of said one or more first operational parameters;
    d) logic configured to (i) calculate said plurality of thresholds for said corresponding one of said one or more first operational parameters as a function of said second operational parameter, said plurality of thresholds including a percentage variance above and below a target value for each of said one or more first operational parameters, (ii) compare said data from said corresponding first operational parameter against at least one of said calculated plurality of thresholds, and (ii) generate an alarm and/or warning when said data from said corresponding first operational parameter crosses at least one of said calculated thresholds in a predetermined direction.

8. The optical transceiver of claim 7, further comprising an interface configured to (i) receive a request for said data from said one or more first operational parameters, alarm and/or warning from an external device, and (ii) provide said data from said one or more first operational parameters, alarm and/or warning in response to said request.

9. The optical transceiver of claim 7, further comprising one or more analog-to-digital converters (ADCs) coupled to said optical transmitter and said optical receiver, wherein said one or more memories comprises a register configured to store said data relating to said one or more operational parameters from said ADCs.

10. The optical transceiver of claim 7, wherein said one or more thresholds comprises a low warning threshold, a high warning threshold, a low alarm threshold, and a high alarm threshold.

11. The optical transceiver of claim 7, wherein a first one of said one or more operating parameters comprises at least one member of the group consisting of a regulated voltage, a bias voltage, a common mode voltage, a bias current, a transmitted optical digital power, a received optical digital power, a received optical video power, a radio-frequency (RF) output power, a modulation amplitude, a modulation frequency, an amplifier gain, a channel spacing, a laser frequency, and a laser wavelength.

12. The optical transceiver of claim 7, wherein a second one of said one or more operating parameters comprises at least one member of the group consisting of laser temperature, module temperature, optical receiver temperature, a voltage, a bias current, and time.

* * * * *